United States Patent
Radus

(10) Patent No.: US 8,520,780 B2
(45) Date of Patent: Aug. 27, 2013

(54) COMMUNICATION UNITS, COMMUNICATION SYSTEM AND METHODS FOR MODULATION AND DEMODULATION

(75) Inventor: Alexander Radus, Falkensee (DE)

(73) Assignee: Motorola Solutions, Inc., Schaumburg, IL (US)

( * ) Notice: Subject to any disclaimer, the term of this patent is extended or adjusted under 35 U.S.C. 154(b) by 656 days.

(21) Appl. No.: 12/664,707

(22) PCT Filed: Jun. 19, 2008

(86) PCT No.: PCT/US2008/067436
§ 371 (c)(1),
(2), (4) Date: Jul. 26, 2010

(87) PCT Pub. No.: WO2008/157661
PCT Pub. Date: Dec. 24, 2008

(65) Prior Publication Data
US 2010/0278286 A1   Nov. 4, 2010

(30) Foreign Application Priority Data

Jun. 21, 2007 (GB) .................................. 0711987.8

(51) Int. Cl.
*H04L 27/22* (2006.01)
(52) U.S. Cl.
USPC ........... 375/329; 375/316; 375/330; 375/331; 375/332; 375/333; 329/304; 329/306; 329/345; 329/346
(58) Field of Classification Search
USPC ................. 375/316, 329, 330, 331, 332, 333; 329/304, 306, 345, 346
See application file for complete search history.

(56) References Cited

U.S. PATENT DOCUMENTS

| | | | | |
|---|---|---|---|---|
| 5,561,468 A * | 10/1996 | Bryan et al. | ................... | 348/469 |
| 5,610,949 A * | 3/1997 | Petranovich | ................... | 375/330 |
| 5,898,684 A | 4/1999 | Currivan | | |
| 6,456,672 B1 * | 9/2002 | Uchiki et al. | ................. | 375/344 |
| 7,710,910 B2 * | 5/2010 | Ode et al. | ....................... | 370/323 |
| 2001/0035997 A1 * | 11/2001 | Agazzi | ........................... | 359/173 |
| 2007/0254693 A1 | 11/2007 | Furukawa | | |
| 2007/0274252 A1 * | 11/2007 | Zhang et al. | ................... | 370/328 |

FOREIGN PATENT DOCUMENTS

| | | |
|---|---|---|
| EP | 1073274 A | 1/2001 |
| WO | WO2006072980 A1 | 7/2006 |

OTHER PUBLICATIONS

PCT International Search Report Dated Dec. 16, 2008.
GB Search and Exaimination Report Dated Sep. 12, 2007.
International Preliminary Report on Patentability and Written Opinion for counterpart International Application No. PCT/US2008/067436 mailed on Jan. 7, 2010.

* cited by examiner

*Primary Examiner* — Siu Lee
(74) *Attorney, Agent, or Firm* — Valerie M. Davis; Daniel R. Bestor

(57) ABSTRACT

A method (500) of demodulation, the method comprising the steps of receiving (510) a radio frequency signal, converting (520) the received radio frequency signal to a baseband signal, performing (530) symbol timing recovery on the baseband signal, and demodulating (540) the baseband signal. The baseband signal comprises alternating symbols spaced therebetween at an alternating first interval length and a second interval length, where the first interval length and second interval length are dissimilar. Communication units and a method of modulation are also described.

7 Claims, 5 Drawing Sheets

COMMUNICATION UNITS, COMMUNICATION SYSTEM AND METHODS FOR MODULATION AND DEMODULATION

CROSS REFERENCE TO RELATED APPLICATIONS

This application is a National Stage filing under 35 USC §371 of co-pending Patent Cooperation Treaty international application having Ser. No. PCT/US2008/067436 (the "PCT international application") filed on Jun. 19, 2008. This application claims priority to the PCT international application and to prior Great Britain (GB) national application having Serial No. 0711987.8, filed on Jun. 21, 2007, Patent Number GB2450363 granted on Jul. 8, 2009, the priority of which was also claimed in the PCT international application. Both the PCT international application and the GB national application are assigned to Motorola, Inc.

TECHNICAL FIELD

The technical field relates generally to a communication unit and methods for modulation and demodulation, and more particularly to a wireless communication unit and methods for modulation and demodulation within a wireless communication unit.

BACKGROUND

Wireless communication systems, for example cellular telephony or private mobile radio (PMR) communication systems, typically provide for radio telecommunication links to be arranged between a number of mobile wireless communication units, often referred to as 'mobile stations' (MSs). In wireless communication systems, a method of communicating between the MSs typically involves use of one or more intermediary stations to forward a received communication from a first MS to a second MS, as provided in 'trunked mode' communication or repeater-based direct mode (DM) communication in a PMR communication system or in a mobile cellular telephone communication system.

In a wireless private mobile radio (PMR) communication system timing mechanisms are typically used. For example, where the wireless PMR communication system operates in accordance with the TErrestrial Trunked RAdio (TETRA) standard defined by the European Telecommunications Standards Institute (ETSI), the TETRA timing structure uses a time division multiple access (TDMA) protocol. Symbol Timing Recovery (STR) is employed and is a procedure by which the receiving MS adjusts its clock timing to match the transmitting MS's timing scheme. Receiving, processing and possibly adapting a clock timing, is performed at least once every multi-frame (eighteen frames) according to the TETRA standard.

It is known for wireless communication units and associated wireless communication systems to utilise Phase Shift Keying (PSK) for the modulation and demodulation of wirelessly transmitted signals. An example of such a communication system is the TETRA system defined by ETSI.

The general principle of most digital modulation schema is that a complex valued baseband signal is selected with desired spectral characteristics. The complex valued baseband signal is then transformed into a real valued high frequency (HF) signal. The spectral characteristics of the HF signal are the same as the spectral characteristics of the baseband signal, for example with respect to bandwidth and shape of the signal. However, in the frequency domain, the signal is shifted into the area around the HF carrier frequency.

In summary, a TETRA baseband signal may be depicted as follows:

$$B(t) = \Sigma a_k g(t-kT) \tag{1}$$

where $a_k$ represents the $k^{th}$ symbol comprising two bits of information to be transferred, and:

$$a_k = a_{k-1} \exp^{\phi j} \tag{2}$$

where $\phi$ is equal to a phase shift between two adjacent symbols according to a scheme, as illustrated in Table 1 below:

TABLE 1

| QPSK phase increment according to recovered bits | |
|---|---|
| Bits | Phase increment |
| 00 | Pi/4 |
| 01 | 3*Pi/4 |
| 10 | −Pi/4 |
| 11 | −3*Pi/4 | wherein:
$g(t-kT)$ is an impulse response of the cosine roll-off filter on the $k^{th}$ symbol, and where a period T is $1/18000$ msec, according to the TETRA symbol rate.

FIG. 1 illustrates a graph 100 of an impulse response of a current symbol 105, with a previous symbol located at 110, and a subsequent symbol located at 115. At the times kT the adjacent symbols are not affected by each other as their impulse responses converge to zero (according to the Nyquist criteria).

Each TETRA signal burst contains in the middle thereof a training sequence, which allows a receiver to locate a position of each symbol within the TETRA signal burst, distinguished by strong energy peaks within the base band signal. This is made possible due to a selection of bit patterns in the training sequence, as defined in the TETRA standards.

Upon receipt of a TETRA signal burst, the receiver locates the training sequence in the middle of the TETRA signal burst, and thereby locates the energy peaks of training sequence symbols. The whole TETRA signal burst is then demodulated, and the phase shifts between the neighbouring symbols calculated as follows:

$$e^{\varphi} = \frac{A_{k+1}}{A_k} \tag{3}$$

where:
$A_{k+1}$ and $A_k$ are the $(k+1)^{th}$ and the $k^{th}$ symbols of the received base band signal respectively, and
$e^{\varphi}$ represents two bits of transmitted information.

A problem for such transmission systems is intra-symbol interference, which in known communication systems is addressed by transmitting symbols at a rate equal to, or slightly above, the Nyquist rate.

Due to an ever-increasing demand for communication bandwidth, it is desirable for the rate at which symbols are transmitted to be increased. However, as is well known in the art, if symbols are transmitted at a rate greater than that of the Nyquist rate, the symbols begin to overlap, causing inter-symbol interference, resulting in a significant increase of the symbol error probability and thereby signal/noise ratio. Such degradation, in the context of reconstructing received signals, is unacceptable. Consequently, the rate at which symbols may be transmitted using known techniques is limited to the Nyquist rate.

Thus, there exists a need for a transmitting communication unit, a receiving communication unit, a communications system and methods of modulating and demodulating phase shift keyed signals that address at least some of the shortcomings of past and present phase shift keying modulation and demodulation techniques and/or mechanisms.

SUMMARY OF THE INVENTION

According to embodiments of the invention, there is provided a transmitting communication unit, a receiving communication unit, a communications system and methods of modulating and demodulating phase shift keyed signals as set forth in the appended claims.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of the concepts that include the claimed invention, and to explain various principles and advantages of those embodiments.

Figure 1:
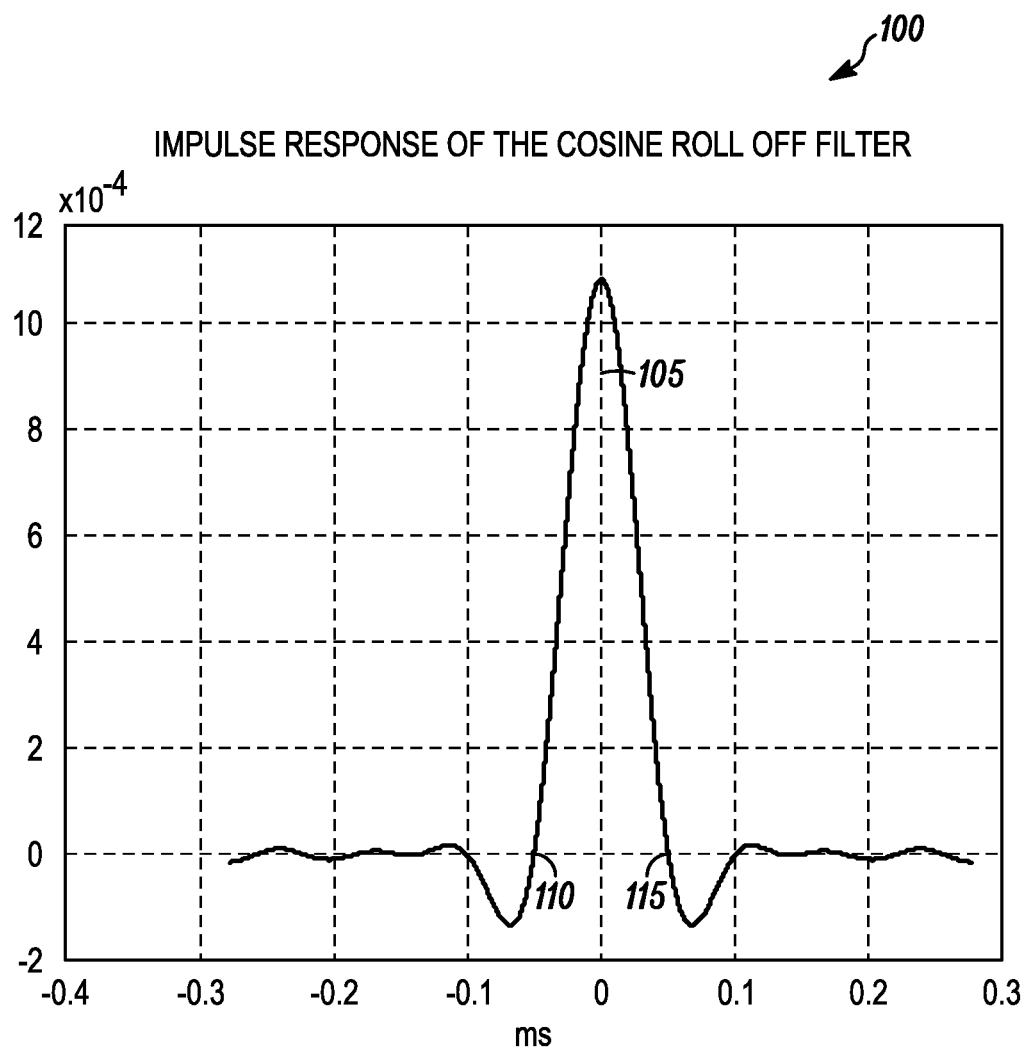
FIG. 1 illustrates a graph of an impulse response as is known in the art.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to various embodiments, the invention relates to a method and apparatus for modulation and demodulation, wherein symbols within a modulated signal are spaced at alternating intervals, enabling a significantly increased symbol rate, whilst only experiencing a slight increase in a probability of symbol error. Those skilled in the art will realize that the above recognized advantages and other advantages described herein are merely illustrative and are not meant to be a complete rendering of all of the advantages of the various embodiments.

Figure 2:
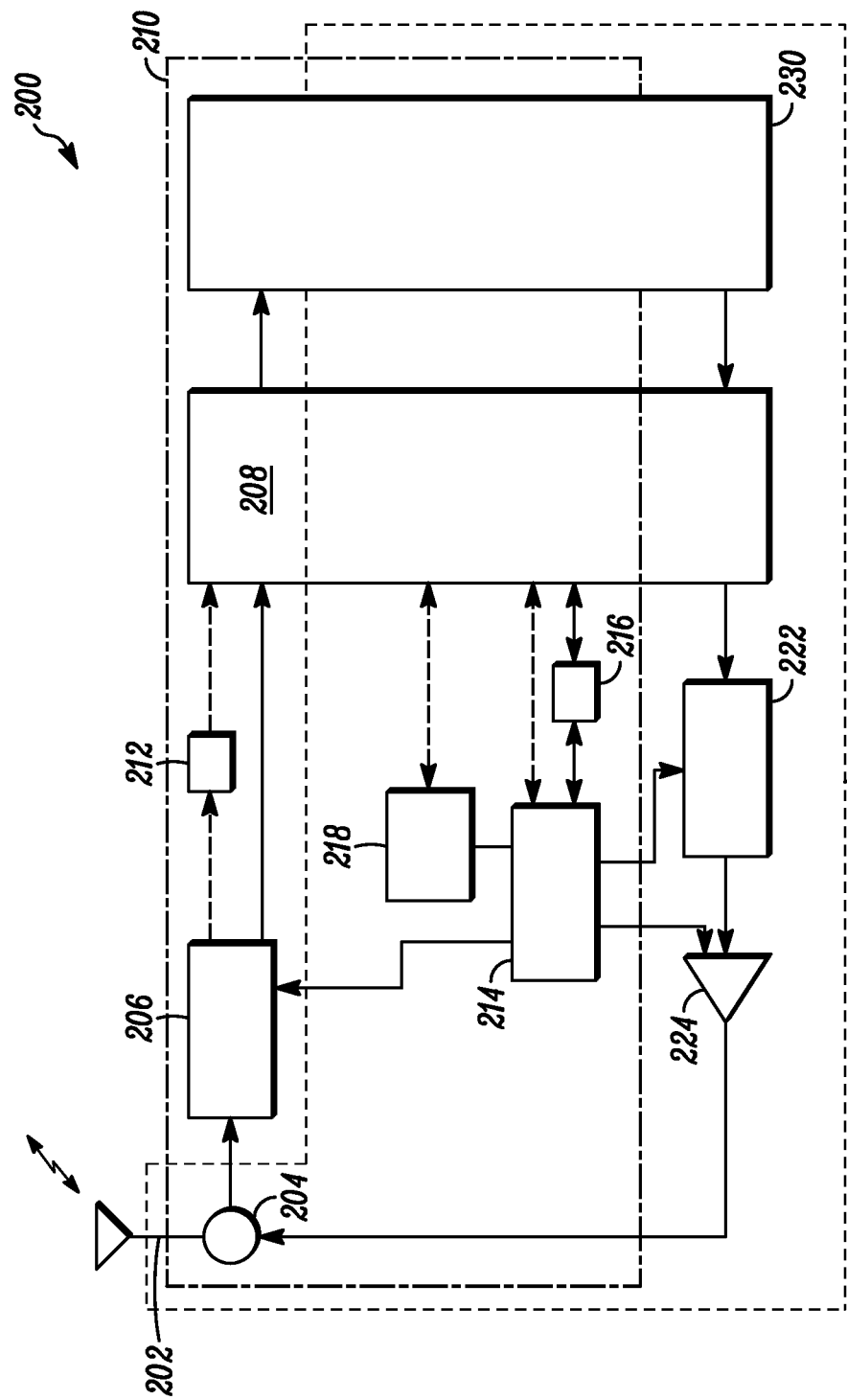
FIG. 2 illustrates a block diagram of a wireless subscriber communication unit in accordance with some embodiments.

Referring now to the drawings, and in particular FIG. 2, a block diagram of a wireless subscriber communication unit in accordance with some embodiments of the invention is shown and indicated generally at 200. Those skilled in the art, however, will recognize and appreciate that the specifics of this example are merely illustrative of some embodiments and that the teachings set forth herein are applicable in a variety of alternative settings. For example, since the teachings described do not depend on a wireless subscriber communication unit, they can be applied to any communication unit although a wireless subscriber communication unit is shown in this embodiment. As such, other alternative implementations involving other types of communication units are contemplated and are considered as being within the scope of the various teachings described.

The wireless subscriber communication unit 200 includes an antenna 202 that, in this embodiment, is coupled to a duplex filter or antenna switch 204 that provides isolation between a receiver chain 210 and a transmitter chain 220 within the wireless subscriber communication unit 200. As is known in the art, the receiver chain 210 typically includes radio frequency receiver circuitry 206 (effectively providing reception, filtering and intermediate or base-band frequency conversion). The front-end circuit is serially coupled to signal processing logic (typically implemented as a digital signal processor) 208. An output from the signal processing logic 208 is provided to a user-interface 230, which may comprise a display, loudspeaker, etc.

The receiver chain 210 also includes received signal strength indicator (RSSI) circuitry 212 (shown coupled to the receiver front-end 206, although the RSSI circuitry 212 could be located elsewhere within the receiver chain 210). The RSSI circuitry is further coupled to the signal processing function 208. Also included within the receiver chain 210 is a controller 214. The controller 214 is coupled to the receiver front-end circuitry 206, the signal processing function 208 and also to a memory device 216 in the receiver chain 210. The memory device 216 stores operating regimes, such as decoding/encoding functions and the like. A timer 218 is coupled to the controller 214 to control the timing of operations (transmission or reception of time-dependent signals) within the wireless subscriber unit 200.

As regards the transmit chain 220, this essentially includes the user-interface 230 comprising elements such as a microphone, keypad, etc. coupled in series to radio transmitter circuitry, which for the illustrated embodiment comprises transmitter/modulation logic 222. Thereafter, any transmit signal is passed through a RF power amplifier 224 to be radiated from the antenna 202. The transmitter/modulation logic 222 and the power amplifier 224 are operationally responsive to the controller 214, with an output from the power amplifier 224 coupled to the duplex filter or antenna switch 204. The transmitter/modulation logic 222 and receiver front-end circuitry 206 comprise frequency up-conversion and frequency down-conversion functions (not shown).

In accordance with embodiments, the signal processing logic 208 has been adapted to demodulate a baseband signal to generate impulse response curves for symbols within the baseband signal, wherein the baseband signal comprises symbols spaced at alternating intervals.

Figure 3:
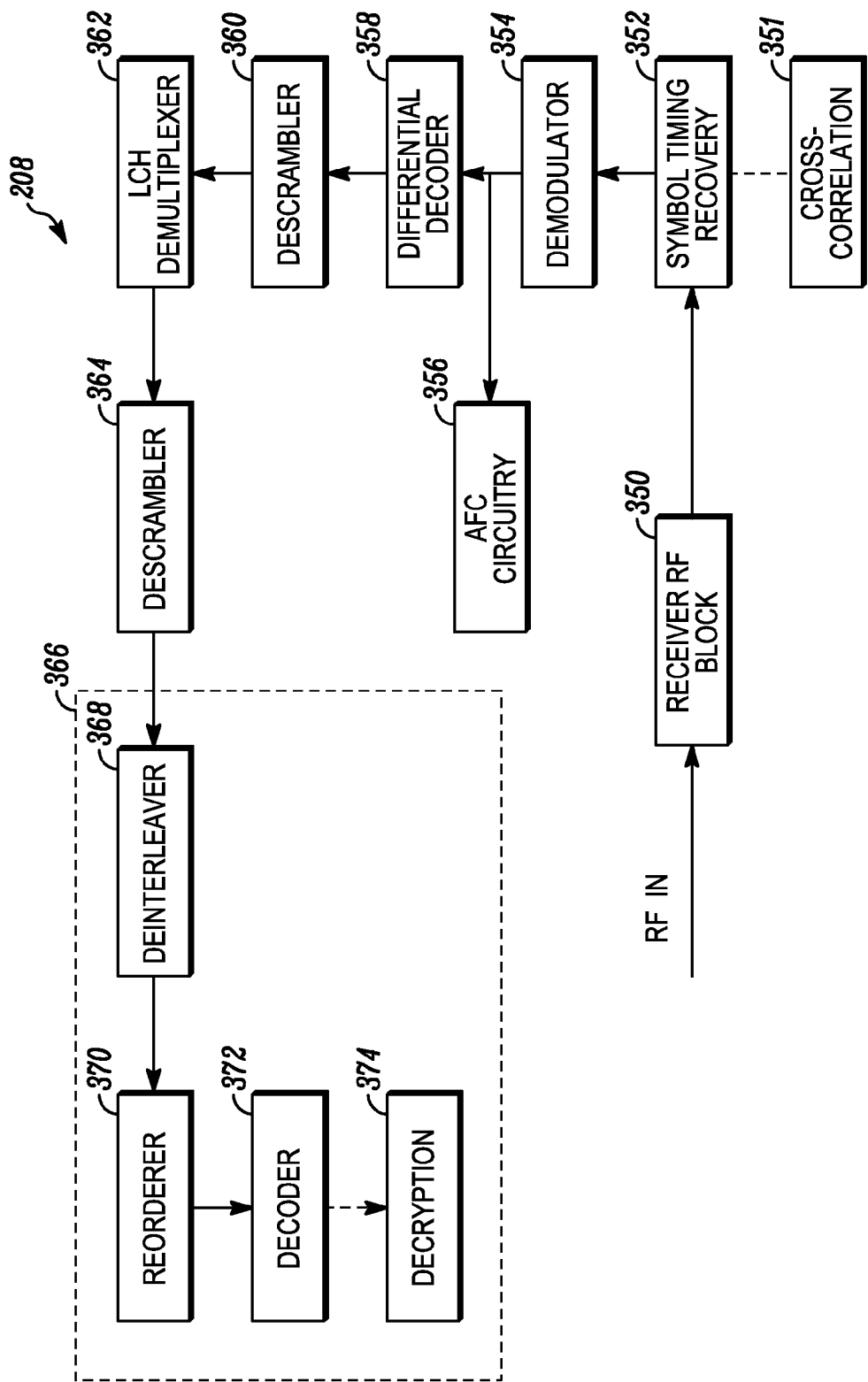
FIG. 3 illustrates a block diagram of receiver signal processing logic of a wireless communication unit adapted in accordance with an embodiment.

Turning now to FIG. 3, a block diagram of receiver signal processing logic 208 of a wireless communication unit that is adapted in accordance with an embodiment is shown. As will be appreciated by a skilled artisan, it is envisaged that the described embodiments, for example the block diagram of receiver signal processing logic 208 apply equally to both a wireless subscriber communication unit as well as a base station unit.

The receiver signal processing logic 208 comprises a series of radio frequency (RF) receiver circuits grouped and shown as receiver block 350, receiving an RF input signal. The RF receiver block 350 may comprise, for example, RF amplification, RF down-mixing, appropriate filtering to filter out unwanted adjacent-channel signals and an analogue to digital converter for conversion of the received analogue signal to a digital equivalent.

The output of the RF receiver block 350 is provided to symbol timing recovery logic 352. The symbol timing recovery logic 352 performs a symbol timing recovery function, which is an important part of the receiving process in that it samples the received data at optimal times and thereby prevents inter-symbol interference between bits in the received data stream.

Cross-correlation logic 351 is connected to the symbol timing recovery logic 352 to perform timing recovery. In known synchronisation acquisition techniques the cross-correlation logic 351 is configured to compare received training/synchronisation sequences. In the classical approach the cross-correlation logic 351 searches for a so called training sequence in the received base band signal, as defined in the TETRA standards.

Once the correct symbol timing and frequency error estimation has been determined from the cross-correlation logic 351, the received data block is input to demodulator 354. The demodulator 354 demodulates the received signal, for example a π/4 differential quadrature phase shift keyed (DQPSK) signal. In the demodulator 354, impulse response curves of the received signal are generated.

The impulse response curves are weighted by complex coefficients, for example according to a quadrature phase shift keyed (QPSK) table, and passed through a baseband filter (not shown). At the output of the baseband filter a sum of complex weighted impulse responses is obtained.

The output of the demodulator 354 then provides a signal to an automatic frequency control 356 (AFC) circuit to estimate, and compensate for, a frequency shift between the received signal and the receiver's local oscillator. A similar output may be provided to an automatic gain control (AGC) circuit, not shown, to ensure that the received signal levels are at an optimal amplitude level so that the received signal is maintained in the linear regions of the receiver's RF circuits.

The demodulator 354 also outputs a series of demodulated symbols that are input to differential decoder 358 for conversion into a series of demodulated bits. The output of the differential decoder 358, in a form of modulation bits, is fed into descrambler logic to restore the transmitted bursts of data into a series of multiplexed bits which is, in turn, input to a logical channel (LCH) de-multiplexer 362 to generate a series of scrambled bits. The series of scrambled bits output from the LCH de-multiplexer 362 is input to de-scrambler 364 to provide a series of received bits that are still interleaved. Up to this point, the receiving functions have all been carried out at the physical channel level of the well-known OSI model. The remaining steps/circuits of the receiver process are carried out within the medium access control (MAC) 366 layer.

The output from the de-scrambler 364 is input to a de-interleaver 368 in the MAC layer 366 for de-interleaving the blocks of bits. The de-interleaving process operates on one time division multiplexing (TDM) slot of received sub-channel symbols. These bits are re-ordered in a re-orderer block 370 to provide encoded bits ready for decoding in a decoder 372. The decoder function may involve a number of decoding operations such as cyclic redundancy checking (CRC), Viterbi decoding, forward error correction (FEC) decoding, etc.

Finally, if the received signal was encrypted for security purposes, the information bits output from the decoder 372 are input to a decryption block 374. If the received signal was a speech signal, the output of the decryption block is input to a speech decoder (not shown) to provide the user with an audible signal.

As previously mentioned for prior art receivers, a TETRA baseband signal may be depicted as follows:

$$B(t) = \Sigma a_k g(t-kT) \quad [1]$$

where:
$a_k$ represents the $k^{th}$ symbol comprising two bits of information to be transferred; and $$a_k = a_{k-1} \exp^{\phi j} \quad [2]$$

where:
φ is equal to the phase shift between two adjacent symbols, and
g(t−kT) is the impulse response (see FIG. 1) of the cosine roll-off filter on the $k^{th}$ symbol, where the period T is 1/18000 msec, according to the TETRA symbol rate.

For such prior art baseband signals, the symbols are evenly spaced within the baseband signal, and are spaced at intervals according to the Nyquist criteria, namely such that at times kT the adjacent symbols are not affected by each other as their impulse responses converge to zero.

According to embodiments described herein, the symbols are arranged to be spaced at alternating intervals, whereby the lengths of intervals between symbols alternate between a first interval length and a second interval length. For example, the spacing between each even symbol and a next consecutive odd symbol comprises a reduced interval length compared to, for example half that of, the interval length between each odd symbol and a next consecutive even symbol.

Equations 3 and 4 below illustrate a baseband signal for the example where the interval length between each even symbol and a next consecutive odd symbol is half that of the interval length between each odd symbol and a next consecutive even symbol:

$$B(t) = \sum_{k=0}^{k=n} a_k g\left(t - \frac{((3k-s)/2)T}{2}\right); \quad [3]$$

where: $\begin{cases} s=1, k=2m+1 \\ s=0, k=2m \end{cases}$ or:

$$B(t) = a_0 g(t) + a_1 g\left(t - \frac{T}{2}\right) + \quad [4]$$
$$a_2 g\left(t - \frac{3T}{2}\right) + a_3 g\left(t - \frac{4T}{2}\right) + a_4 g\left(t - \frac{6T}{2}\right) + \ldots$$

As can be seen, the interval length between each even symbol and the next consecutive odd symbol is T/2 and the interval length between each odd symbol and the next consecutive even symbol is T. In one embodiment, the interval T is equal to the interval according to the Nyquist criteria if all the symbols were evenly spaced.

In this manner, the average symbol rate is 4/3 T, as compared with a symbol rate of 1/T with the prior art baseband signals, thereby yielding an improvement of approximately 33.3%.

As will be appreciated by a skilled artisan, although this increase in the symbol rate is advantageous from the point of view of increasing throughput (bit rate), there is a trade-off in terms of intra-symbol interference, introduced between the even and odd symbols. The transmitted baseband symbol at each sampling point can therefore be expressed as follows:

$$\begin{cases} a_k + a_{k+1}g\left(\frac{T}{2}\right) = A_k \\ a_{k+1} + a_k g\left(\frac{T}{2}\right) = A_{k+1} \\ a_{k+2} + a_{k+3}g\left(\frac{T}{2}\right) = A_{k+2} \\ a_{k+3} + a_{k+2}g\left(\frac{T}{2}\right) = A_{k+3} \\ \ldots \end{cases} \quad [5]$$

From Equation 5 above, the phase shift between each even symbol and the next consecutive odd symbol may be expressed, using the symbols k and k+1 as examples, as follows:

$$e^{\varphi_{k/k+1}} = \frac{A_k g(T/2) - A_{k+1}}{A_{k+1} g(T/2) - A_k} \quad [6]$$

and the phase shift between each odd symbol and the next consecutive even symbol may be expressed, using the symbols k+1 and k+2 as examples, as follows:

$$e^{\varphi_{k+1/k+2}} = \frac{A_{k+2} - A_{k+3}g(T/2)}{A_{k+1} - A_k g(T/2)} \quad [7]$$

It may be assumed that the received signal burst is received with a constant attenuation l, where the attenuation does not change within the burst. Accordingly, the received baseband symbol at each sampling point may be expressed as follows:

$$\begin{cases} \left(a_k + a_{k+1}g\left(\frac{T}{2}\right)\right)l + n_0 = B_k \\ \left(a_{k+1} + a_k g\left(\frac{T}{2}\right)\right)l + n_1 = B_{k+1} \\ \left(a_{k+2} + a_{k+3}g\left(\frac{T}{2}\right)\right)l + n_2 = B_{k+2} \\ \left(a_{k+3} + a_{k+2}g\left(\frac{T}{2}\right)\right)l + n_3 = B_{k+3} \\ \ldots \end{cases} \quad [8]$$

where: l is attenuation, and $n_0$, $n_1$, $n_2$, $n_3$ represent noise present at respective sampling points.

Using Equation 6, we can therefore reconstruct the phase shift between each even symbol and the next consecutive odd symbol, once again using the symbols k and k+1 as examples, as follows:

$$e^{\varphi_{k/k+1}} = \frac{B_k g(T/2) - B_{k+1}}{B_{k+1} g(T/2) - B_k} = \frac{(A_k l + n_0)g(T/2) - (A_{k+1} l + n_1)}{(A_{k+1} l + n_1)g(T/2) - (A_k l + n_0)} \quad [9]$$

and using Equation 7, we are able to reconstruct the phase shift between each odd symbol and the next consecutive even symbol, which may be expressed, once again using the symbols k+1 and k+2 as examples, as follows:

$$e^{\varphi_{k+1/k+2}} = \frac{B_{k+2} - B_{k+3}g(T/2)}{B_{k+1} - B_k g(T/2)} = \frac{(A_{k+2} l + n_2) - (A_{k+3} l + n_3)g(T/2)}{(A_{k+1} l + n_1) - (A_k l + n_0)g(T/2)} \quad [10]$$

Thus, Equations 9 and 10 above may be used to demodulate symbols within a received signal burst wherein the spacing between each even symbol and a next consecutive odd symbol comprises an interval length equal to half that of the interval length between each odd symbol and a next consecutive even symbol.

As previously mentioned, the teachings herein may provide an advantage of an increased symbol rate, with a trade-off in terms of intra-symbol interference, introduced between the even and odd symbols.

For the example shown, where the spacing between each even symbol and a next consecutive odd symbol comprises an interval length equal to half that of the interval length between each odd symbol and a next consecutive even symbol, embodiments provide an increase in symbol rate for Quadrature Phase Shift Keying (QPSK) comparable to 3π/8 PSK.

In accordance with embodiments, the known training sequence remains modulated in the existing manner, to facilitate the timing recovery by resolving the above equations.

In accordance with embodiments, as would be appreciated by a skilled artisan, the aforementioned description of how to generate a digital baseband signal from a bit stream and vice versa how to recover the bit stream out of a received base band signal in the proposed new manner, may be implemented in the digital signal processing software or associated, equivalent logic elements.

Figure 4:
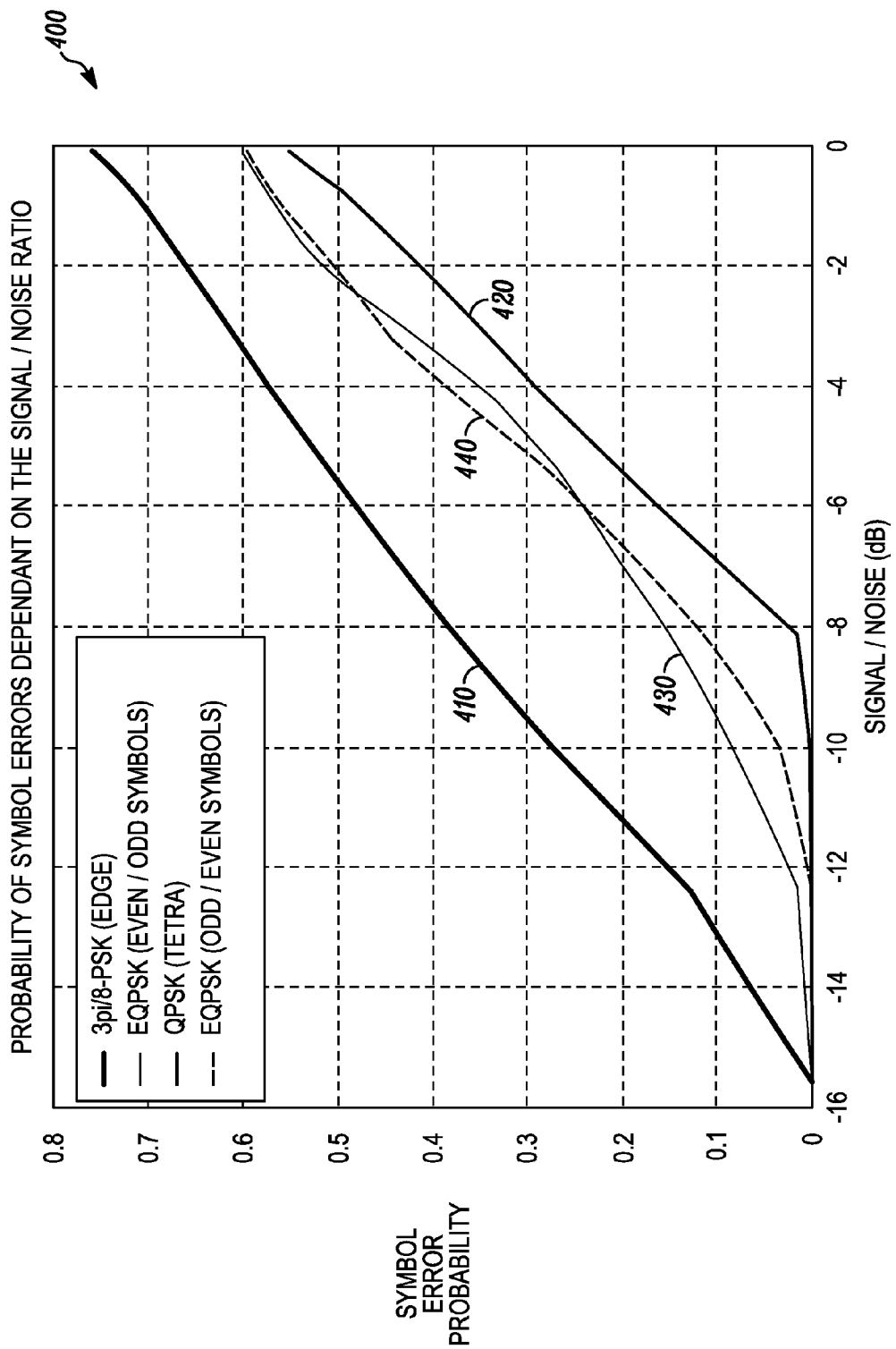
FIG. 4 illustrates a graph showing a probability of symbol errors.

FIG. 4 illustrates a graph 400 showing a probability of symbol errors, dependent upon the signal/noise ratio, according to simulations comparing PSK demodulation implementing the inventive concept described herein to known QPSK demodulation, for example as used in the TETRA communication system, and to known 3π/8 PSK demodulation, for example as used in an Enhanced Data rate for Global Evolution (EDGE) communication system. For PSK demodulation implementing the inventive concept described herein, two curves were calculated to take into account the differences in Equations 9 and 10 above.

The graph comprises a first curve 410, representing a probability of symbol errors for 3π/8 PSK demodulation, and a second curve 420, representing a probability of symbol errors for standard QPSK demodulation. As can be seen from these two curves, although 3π/8 PSK demodulation enables a higher symbol rate as compared to standard QPSK, it suffers from a significantly higher probability of symbol errors.

The graph also comprises two further curves, 430, 440, representing a probability of symbol errors for PSK demodulation implementing the inventive concept described herein. As previously mentioned, PSK demodulation implementing the inventive concept described herein enables a symbol rate comparable to that of 3π/8 PSK demodulation. However, as can be seen, the probability of symbol errors for PSK demodulation implementing the inventive concept described herein is significantly lower than for 3π/8 PSK demodulation, and only slightly higher than for standard QPSK demodulation.

As will be appreciated by a skilled artisan, this slight increase in a probability of symbol errors is well worth sacrificing in order to achieve the significant increase in symbol rate.

Figure 5:
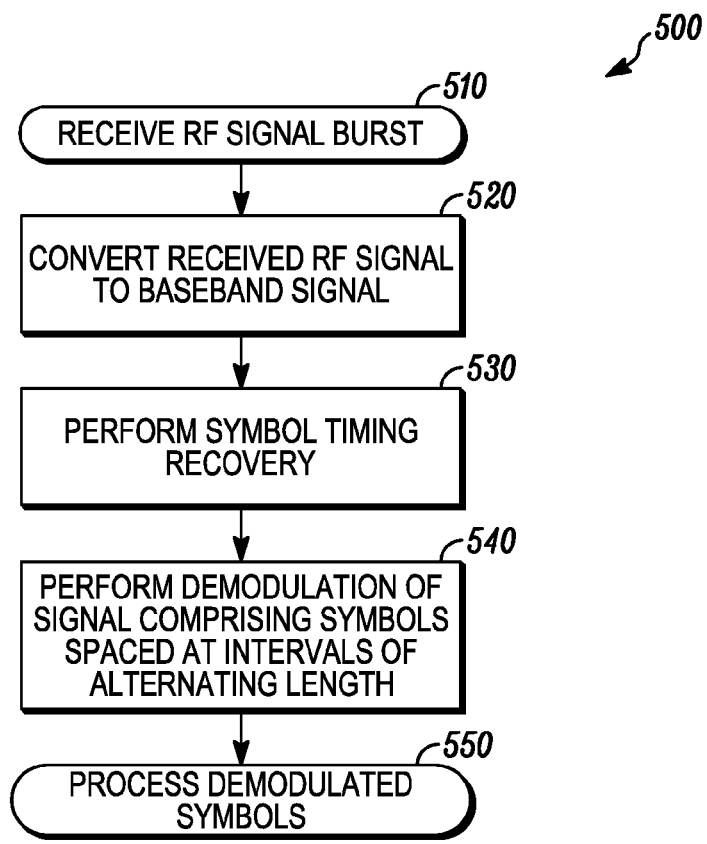
FIG. 5 illustrates a flow chart of a method for demodulating a received signal in accordance with an embodiment.

Referring now to FIG. 5, there is illustrated a flow chart of a method 500 for demodulating a received signal, according to embodiments.

The method starts at step 510, with a receipt of an RF signal burst. Next, in step 520, the received RF signal is converted into a baseband signal. The conversion of a received RF signal to a baseband signal is well known in the art, and for the embodiment illustrated in FIG. 3 is performed by the RF receiver block 350.

Next, in step 530, symbol timing recovery is performed on the baseband signal. For the embodiment illustrated in FIG. 3, this is performed by the symbol recovery logic 352 and the cross-correlation logic 351. Symbol timing recovery may comprise locating a training sequence within the received baseband signal, and comparing this training sequence to a template training sequence stored in memory in order to estimate timing and frequency errors within the received signal.

Having performed symbol timing recover, the next step 540 is to perform, for example by demodulator 354 in FIG. 3, demodulation of the received signal to generate impulse response curves for the symbols within the received signal.

In accordance with embodiments, the received baseband signal comprises symbols that are spaced at alternating intervals, whereby the lengths of intervals between symbols alternate between a first interval length and a second interval length. For example, a spacing between each even symbol and a next consecutive odd symbol comprises a reduced interval length compared to, for example, half that of, the interval length between each odd symbol and a next consecutive even symbol.

Thus, for the example described above, wherein the interval length between each even symbol and a next consecutive odd symbol is half that of the interval length between each odd symbol and a next consecutive even symbol, the received baseband signal is demodulated using Equations 9 and 10 above. The impulse response curves are then weighted by complex coefficients, according to, for example, a QPSK table, and passed through a baseband filter, as known in the art. Thus, at the output of the demodulator 354 a sum of complex weighted impulse responses is obtained.

Finally, in step 550, the demodulated symbols, or more specifically the weighted impulse responses therefor, are processed. For the embodiment illustrated in FIG. 3, this may comprise providing the demodulated symbols to the differential decoder 358.

Referring back to FIG. 2, the transmitter/modulation logic 222 according to one embodiment is also adapted to modulate a received baseband signal comprising symbols to be up converted and transmitted as an RF signal. In accordance with a further aspect of the invention, the transmitter/modulation logic 222 is adapted to modulate the baseband signal, such that the symbols are spaced at alternating intervals, whereby the lengths of intervals between symbols alternate between a first interval length and a second interval length.

For example, the spacing between each even symbol and a next consecutive odd symbol comprises a reduced interval length compared to, for example half that of, the interval length between each odd symbol and a next consecutive even symbol. Accordingly, the transmitter/modulation logic 222 modulates the received baseband signal using Equations 6 and 7 above.

Figure 6:
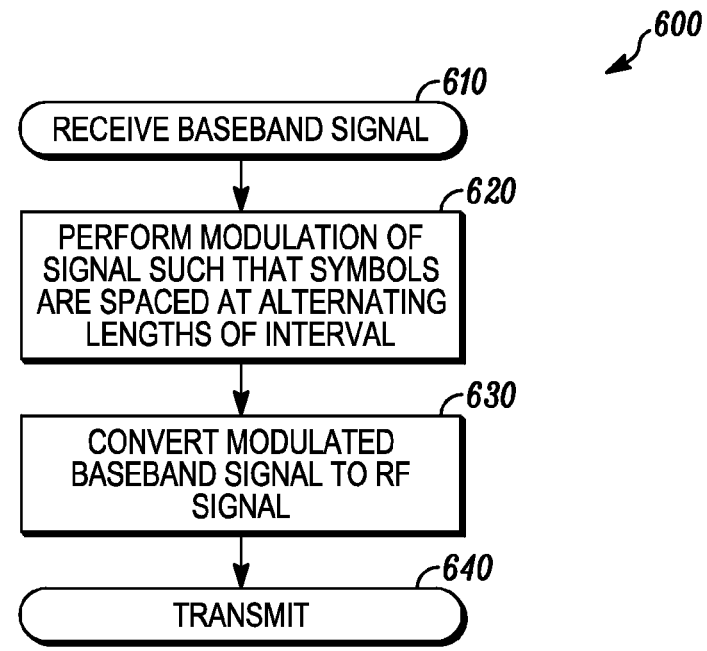
FIG. 6 illustrates a flow chart of a method for modulating a signal to be transmitted in accordance with an embodiment.

Referring now to FIG. 6, there is illustrated a flow chart of a method 600 of modulating a signal to be transmitted in accordance with an embodiment.

The method starts at step 610, with the receipt of a baseband signal to be transmitted. Next, in step 620, the received signal is modulated to generate a modulated signal that comprises symbols that are spaced at intervals of alternating lengths. The modulated signal is then converted to an RF signal, in step 630, and then transmitted in step 640.

For the embodiment illustrated in FIG. 2, the transmitter/modulation logic 222 performs both the modulation step 620 and the step 630 of converting the modulated signal to an RF signal. However, it will be appreciated that these two steps may be performed by separate logical components.

As will be appreciated by a skilled artisan, embodiments may be implemented within existing communication units and systems by way of modifications to only the modulation and demodulation functions or logic elements or with network elements, such as base stations. This may be achieved by way of software upgrades or the like, without the need for substantial software changes, or hardware upgrades.

Although embodiments have been described with reference to alternating between two symbol intervals, it is within the contemplation of the teachings herein that the inventive concept may equally be used with between three or more alternating symbol intervals, albeit using different and potentially more complex set of equations, as would be appreciated by a skilled artisan.

It is within the contemplation of the teachings herein that the inventive concept is not limited to phase shift keying (PSK) modulation, but may be applied in any communication system in which a signal may be modulated such that symbols contained within the modulated signal may be spaced therebetween at alternating intervals. Thus, an improvement in symbol rate may be gained with only a slight increase in the probability of symbol errors, by performing demodulation with respect to symbols that are spaced at alternating intervals, whereby the lengths of intervals between symbols alternate between a first interval length and a second interval length.

It will be understood that the wireless communication unit, communication system and methods of PSK modulation and demodulation, as described above, may provide at least the advantage of increased symbol rate with only a slightly increased probability of symbol error.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as 'first' and 'second', 'top' and 'bottom', and the like may be used solely to distinguish one entity or action from another entity or action without necessarily requiring or implying any actual such relationship or order between such entities or actions. The terms 'comprises,' 'comprising,' 'has', 'having,' 'includes', 'including,' 'contains', 'containing' or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by 'comprises . . . a', 'has . . . a', 'includes . . . a', 'contains . . . a' does not, without more constraints, preclude the existence of additional identical elements in the process, method, article, or apparatus that comprises, has, includes, contains the element. The terms 'a' and 'an' are defined as one or more unless explicitly stated otherwise herein. The terms 'substantially', 'essentially', 'approximately', 'about' or any other version thereof, are defined as being close to as understood by one of ordinary skill in the art The term 'coupled' as used herein is defined as connected, although not necessarily directly and not necessarily mechanically. A device or structure that is 'configured' in a certain way is configured in at least that way, but may also be configured in ways that are not listed.

It will be appreciated that some embodiments may be comprised of one or more generic or specialized processors (or 'processing devices') such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for PSK modulation and demodulation described herein. The non-processor circuits may include, but are not limited to, a radio receiver, a radio transmitter, signal drivers, clock circuits, power source circuits, and user input devices. As such, these functions may be interpreted as steps of a method to perform PSK modulation and demodulation described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a 'processing device' for purposes of the foregoing discussion and claim language.

Moreover, an embodiment can be implemented as a computer-readable storage element having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of modulation, the method comprising:
receiving a baseband signal to be transmitted; and
modulating the baseband signal such that even and next consecutive odd symbols contained within the modulated baseband signal are spaced therebetween at a first interval length and odd and next consecutive even symbols contained within the modulated baseband signal are spaced therebetween at a second interval length, where the first interval length and second interval length are dissimilar;
wherein the first interval length comprises a reduced interval length compared to the second interval length.

2. The method of claim 1, wherein the second interval length comprises an interval length according to a Nyquist criteria.

3. The method of claim 1, wherein the first interval length comprises an interval length substantially equal to half of the second interval length.

4. The method of claim 1, wherein the modulation comprises phase shift keying modulation.

5. The method of claim 4, wherein the modulation comprises quadrature phase shift keying modulation.

6. The method of claim 1, wherein one of the first interval length and the second interval length is set to conform to a Nyquist criteria rate and the other of the first interval length and the second interval length is set to less than the one of the first interval length and the second interval length.

7. The method of claim 6, wherein the other of the first interval length and the second interval length is half that of the one of the first interval length and the second interval length.

* * * * *